Dec. 9, 1969 W. K. HICKOK 3,483,316

HUE CONTROL CIRCUITRY FOR COLOR TELEVISION RECEIVERS

Filed Feb. 14, 1967

INVENTOR.
WILLIAM K. HICKOK
BY Robert E. Strauss
ATTORNEY

United States Patent Office 3,483,316

Patented Dec. 9, 1969

3,483,316
HUE CONTROL CIRCUITRY FOR COLOR TELEVISION RECEIVERS

William Kelsey Hickok, Williamsville, N.Y., assignor to Sylvania Electric Products Inc., a corporation of Delaware Filed Feb. 14, 1967, Ser. No. 616,071
Int. Cl. H04n 5/44
U.S. Cl. 178—5.4 11 Claims

ABSTRACT OF THE DISCLOSURE

The hue of a reproduced color image is manually altered by a circuit arrangement wherein the phase of a generated reference oscillation signal is shifted with respect to the phase of a received chrominance signal. This alteration in phase relationship provides the desired variations in the hue of the reproduced color image.

BACKGROUND OF THE INVENTION

Present-day color television receivers normally include a circuit arrangement for manually adjusting the hue of a reproduced color image. In known circuit arrangements for providing such manual adjustments, a color burst signal appearing at the output transformer of a color burst amplifier is shifted in phase by altering the resonant frequency of the output transformer. Normally, the secondary of the output transformer is tuned to resonance by one or more capacitors connected in parallel therewith and an alterable resistor shunting the capacitors. Varying the alterable resistor causes a variation in the capacitive reactance seen across the secondary of the transformer whereupon the resonant frequency of the tuned circuitry is altered and a phase shift in color burst signal is effected. Thereafter, this phase shifted color burst signal is applied to a pair of demodulators wherein the phase shifted burst signal in combination with a reference signal generated within the receiver and applied to the demodulators causes a shift in hue of the reproduced color image in accordance with the manually adjusted phase shift of the color burst signal.

Although the above-described hue control circuitry has been utilized in color receivers for a number of years and has provided reasonably acceptable results, it has been found that such circuitry leaves much to be desired for a number of reasons. For example, it has been found that varying the value of the resistance shunting the tuned output circuitry causes an alteration in the "Q" of the circuitry which, in turn, affects the amplitude of the burst signals. Since the amplitude of the burst signals is frequently used as a reference for systems employing automatic chroma control (ACC), the above-mentioned undesirable variations in burst signal amplitude are deleterious to the operation of the color receiver. Also, adjusting the shunting resistor or hue control to provide a maximum "Q" frequently causes development of ringing in the transformer circuitry and development of a relatively high amplitude phase shifted signal which, upon occasion, not only causes the color-killer circuitry to become operational but also poses high frequency or harmonic burst radiation problems. Thus, external damping components are frequently added to the circuitry to dampen the ringing effects and such additions are not only expensive but also deleterious to the amplitude of the burst signals and to the receiver operation.

OBJECTS AND SUMMARY OF THE INVENTION

In view of the above-described problems, it is an object of this invention to provide enhanced hue control circuitry for a color television receiver. Another object of the invention is to provide an inexpensive manually operable hue control arrangement for a color television receiver. Also, it is an object of the invention to provide hue control circuitry for a color television receiver wherein a source of oscillation signals is substantially unaffected by adjustments in the phase of the generated signal.

Briefly, these and other objects and advantages are achieved in one aspect of the invention by a circuit arrangement which includes an electron device having a control electrode and a pair of signal output electrodes. The control electrode is coupled to a source of reference oscillation signals, one of the pair of signal output electrodes is coupled to a demodulation means, the other signal output electrode is coupled to a phase comparing means, and an adjustable phase shifting means is coupled intermediate one of the pair of signal output electrodes and circuit ground.

DESCRIPTION OF THE PREFERRED EMBODIMENT

The following disclosure of one specific embodiment of the invention as well as other and further objects, advantages and capabilities thereof will be better understood when considered in connection with the accompanying drawing and appended claims.

Figure 1:
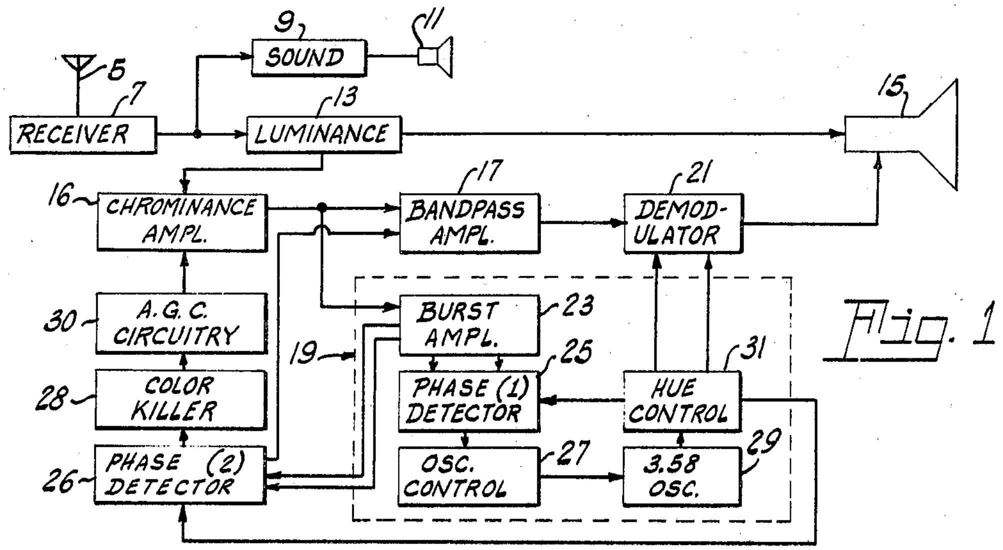
FIG. 1 is a partial block diagram illustrating the location of one embodiment of the present invention with respect to a typical color television receiver.

Referring to FIG. 1 of the drawing, a typical color television receiver includes an antenna 5 coupled to a receiver 7 having the usual radio frequency (RF), intermediate frequency (IF), and video amplification and detection stages. One output of the receiver 7 is coupled to a normal sound channel 9 wherein audio signals are detected and amplified and applied to a loud speaker 11.

Another output signal from the receiver 7 is applied to a luminance channel 13 which includes the usual amplification stages and delay line components to provide a signal which represents variations in brightness of a viewed image and is applied to an image reproducer 15 such as a color cathode ray tube. The luminance channel 13 also provides a composite color signal which includes chrominance, luminance, color burst, synchronizing, and blanking signals. This composite color signal is applied through a chrominance amplifier 16 to a bandpass amplifier stage 17 and to a color synchronizing network 19.

The bandpass amplifier 17 separates the chrominance signal from the composite color signal and applies this separated chrominance signal in the form of a 3.58 mc. subcarrier signal modulated by chrominance information to a demodulation means 21. Therein, color difference signals are extracted from the chrominance signal and applied to the image reproducer 15 wherein the luminance and color difference signals are combined to provide a viewable color image.

In order to extract the above-mentioned color difference signals from the applied chrominance signals, a local oscillator must be synchronized in frequency and phase angle with the subcarrier signal. This synchronization process is accomplished by means of the color synchronizing network 19 which includes a color burst amplifier stage 23, a first phase detector stage 25, an oscillator frequency control stage 27, a local oscillator stage 29, and hue control circuitry 31. Also, the color synchronizing network 19 serves to control the chrominance amplifier stage 16 and bandpass amplifier 17 by way of a second phase detector stage 26, a color-killer 28, and automatic chroma control circuitry 30.

Generally, a composite color signal from the luminance channel 13 is applied to the color burst amplifier stage 23 via the chrominance amplifier stage 16. The color burst amplifier stage 23 serves to separate the color burst signal from the composite color signal and this color burst signal is applied to the first and second phase detector stages 25 and 26 respectively.

Also, a CW signal at a frequency of about 3.58 mc., substantially the frequency of the previously mentioned subcarrier signal, is generated by the local oscillator stage 29. This CW signal is applied to the hue control circuitry 31 and a pair of output signals are provided which are coupled to the phase detector stages 25 and 26, respectively. Also, the hue control circuitry 31 provides output signals which are coupled to the demodulation means 21 as will be explained more fully hereinafter.

The phase detector stages 25 and 26, respectively, compare the color burst signals and the generated CW signals with respect to phase relationship and each of the phase detector stages 25 and 26 provides a control signal. The control signal from the first detector stage 25 is applied to the oscillator control stage 27 which operates to provide a signal which shifts the frequency of the signal generated by the local oscillator stage 29 in a direction such that a phase difference between the color burst signals and the generated CW signals is reduced. Similarly, the second phase detector stage 26 provides a control signal which is applied via a color-killer stage 28 and automatic chroma control circuitry 30 to the chroma amplifier stage 16 as well as to the bandpass amplifier stage 17.

Figure 2:
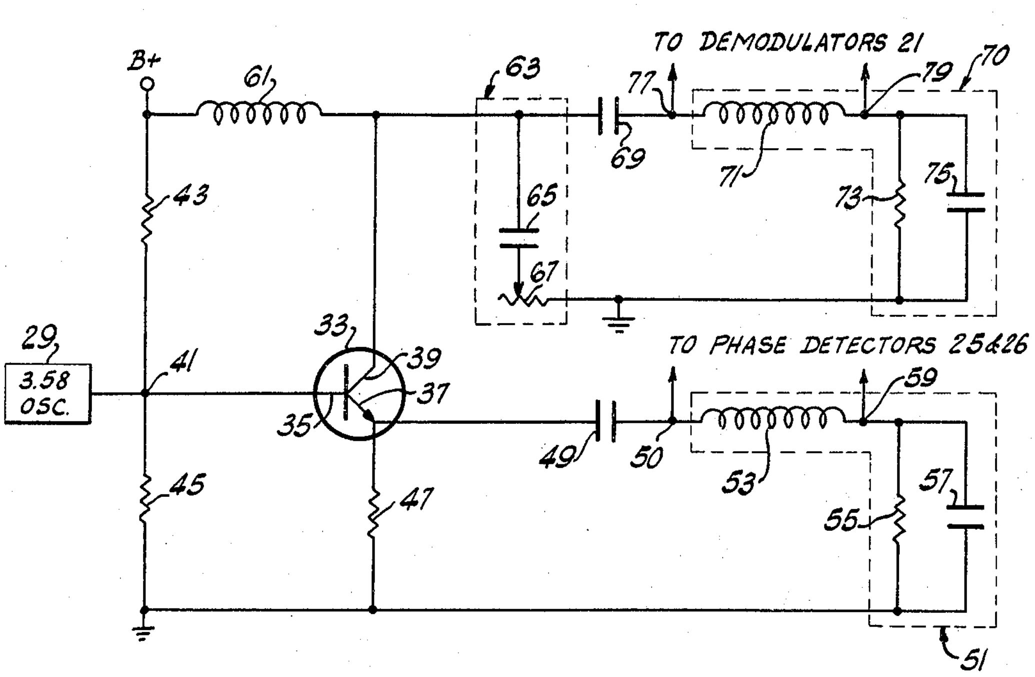
FIG. 2 is a block and schematic illustration of one specific hue control circuitry arrangement applicable to the color receiver of FIG. 1.

Referring to a specific embodiment of the hue control circuitry 31, FIG. 2 illustrates an electron device 33 in the form of a transistor having a control electrode 35, a first output electrode 37, and a second output electrode 39. The control electrode 35 is coupled to the output of the local oscillator stage 29 of FIG. 1 and to the junction 41 of a pair of series connected bias developing resistors 43 and 45 connected intermediate a voltage source B+ and circuit ground. The first output electrode 37 is connected to circuit ground by way of a feedback resistor 47 and via a coupling capacitor 49 to a first junction 50 connected to the phase detector stage 25 of FIG. 1. A fixed phase shift network 51 includes an inductor 53 and a parallel connected resistor 55 and capacitor 57 series connected intermediate the capacitor 49 and circuit ground. Also, the junction 59 of the series connected inductor 53 and parallel connected resistor 55 and capacitor 57 is coupled to the phase detector stage 26 of FIG. 1.

The second output electrode 39 of the electron device 33 is connected to the voltage source B+ via an inductor 61 and to circuit ground via an alterable phase shifting network 63 which includes a series connected capacitor 65 and alterable resistor 67. A series connected capacitor 69 and a fixed phase shift network 70, including an inductor 71 in series connection with a resistor 73 shunted by a capacitor 75, are shunt connected across the alterable phase shifting network 63. The inductor 71 separates a first connection 77 and a second connection 79 to the demodulation means 21 of FIG. 1.

As to the operation, a CW signal from the oscillator stage 29 is applied to the control electrode 35 of the electron device 33 and a first output signal of substantially the same phase and magnitude as the applied signal appears at the first output electrode 37. This first output signal is applied via the coupling capacitor 49 and a first junction 50 to the phase detector stage 25. The fixed phase shift network 51 provides a quadrature signal at the junction 59 which is coupled to the phase detector stage 26. As previously mentioned, the phase detector stage 25 compares the generated CW signal and the color burst signal and provides a control signal which serves to alter the operation of the oscillator stage 29 such that the phase and frequency difference between signals tends to be reduced.

Also, a second output signal having a current waveform shifted in phase by approximately 180° from the voltage waveform applied to the control electrode 35 appears at the second output electrode 39. Thereat, the series connected inductor 61 and alterable phase shift network 63 permit a variation in the phase of the voltage with substantially negligible effect upon the current waveform. This phase shifted voltage waveform is coupled via a coupling capacitor 69 and a first junction 77 to the demodulation means 21. Also, the fixed phase shift network 71 provides a quadrature signal which is coupled via the junction 79 to the demodulation means 21. Thus, the alterable resistor 67 provides a manual means for hue adjustment by varying the phase of the CW signal generated by the oscillator 29 and applied to the demodulation means 21 for phase comparison with the chrominance signal available from the bandpass amplifier 17 and applied to the demodulation means 21.

Alternatively, it is to be understood that the demodulation means 21 and phase detector stages 25 and 26 may be interchanged without deleterious effect upon the operation of the color receiver or the hue control circuitry 31. Under such conditions, it is obvious that manual adjustment of the alterable phase shift network 63 would phase shift the signal applied to the phase detector 25 which, in turn, would provide a correction signal shifting the operational frequency of the oscillator 29 and the phase of the signal applied to the demodulation means 21 thereby effecting the desired shift in hue of a reproduced color image.

Thus, there has been provided unique hue control circuitry, applicable to present-day color television receivers, and having numerous advantages over any known circuitry. The circuitry is simple and inexpensive and provides a readily accessible manual adjustment of hue in a reproduced color image. Also, the circuitry provides independent and isolated adjustments in phase, which correspond to hue, with respect to the operation of the reference CW signal generator and the color synchronizing network. Further, the circuitry, which utilizes an electron device operating essentially as an emitter follower having degenerative feedback, provides a substantially constant gain in signals applied to both the phase detection and demodulation stages while minimizing undesired distortion and loading of the reference CW signal generator. Moreover, it will be obvious to those skilled in the art that various changes and modifications may be made in the above-described embodiments without departing from the scope of the invention as defined by the appended claims.

I claim:

1. In a color television receiver for reproducing a color image in response to composite color signals wherein is included demodulation means for recovering chrominance information, bandpass means for recovering chrominance information conveyed on a modulated carrier from said composite signals and applying the recovered chrominance information and modulated carrier to said demodulation means, a source of reference oscillation signals, and color synchronizing means for recovering burst oscillation signals from said composite color signals and phase comparing said recovered burst signals with said reference oscillation signals from said source, hue control circuitry comprising in combination:

- an electron device having a control electrode and a pair of signal output electrodes;
- means for coupling said control electrode to a reference oscillation signal source;
- means for coupling one of said pair of signal output electrodes to a demodulation means and the other of said pair of signal output electrodes to a phase comparing means of said color synchronizing means; and an adjustable phase shift means connected intermediate one of said pair of signal output electrodes and circuit ground.

2. The hue control circuitry of claim 1 wherein said adjustable phase shift means is in the form of a series connected capacitor and an alterable resistor.

3. The hue control circuitry of cliam 1 wherein said means for coupling said pair of signal output electrodes to the phase comparing means of said color synchronizing means and to said demodulation means includes a series connected capacitor and a fixed phase shift network coupled intermediate each one of said output electrodes and circuit ground.

4. The hue control circuitry of claim 1 wherein the waveform of current at the signal output electrode connected to circuit ground by said adjustable phase shift means is phase shifted by about 180° with respect to the waveform of voltage applied to said control electrode and the phase of the waveform of voltage appearing at said signal output electrode is substantially independent of the phase of the waveform of voltage appearing at the other signal output electrode.

5. The hue control circuitry of claim 1 wherein said signal output electrode coupled to circuit ground by said adjustable phase shift means is also connected to a voltage source by an inductor.

6. The hue control circuitry of claim 1 wherein the other of said pair of signal output electrodes is coupled to circuit ground by a feedback resistor.

7. The hue control circuitry of claim 1 wherein said adjustable phase shift means is connected intermediate said means for coupling one of said pair of signal output electrodes to a demodulation means and circuit ground.

8. The hue control circuitry of claim 1 wherein said adjustable phase shift means is connected intermediate said means for coupling said signal output electrode to a phase comparing means of said color synchronizing means and circuit ground.

9. The hue control circuitry of claim 3 wherein said fixed phase shift network includes an inductor in series connection with a fixed resistor shunted by a capacitor.

10. The hue control circuitry of claim 4 wherein the waveform of voltage at said signal output electrode connected to circuit ground by said adjustable phase shift means is shifted in phase by varying the setting of said adjustable phase shift means.

11. The hue control circuitry of claim 6 wherein said phase comparing means and said demodulation means are each connected to opposite ends of said inductor of said fixed phase shift network of one of said means for coupling said pair of signal output electrodes to said phase comparing means and said demodulation means.

References Cited

UNITED STATES PATENTS

| | | | |
|---|---|---|---|
| 3,007,999 | 11/1961 | Kelly. | |
| 3,274,334 | 9/1966 | Hansen et al. | 178—5.4 |
| 3,294,900 | 12/1966 | Kool | 178—5.4 |
| 3,436,470 | 4/1969 | Konkel et al. | 178—5.4 |

RICHARD MURRAY, Primary Examiner